L. E. MILLS.
TIRE BOOT.
APPLICATION FILED SEPT. 22, 1921.
1,438,657.
Patented Dec. 12, 1922.
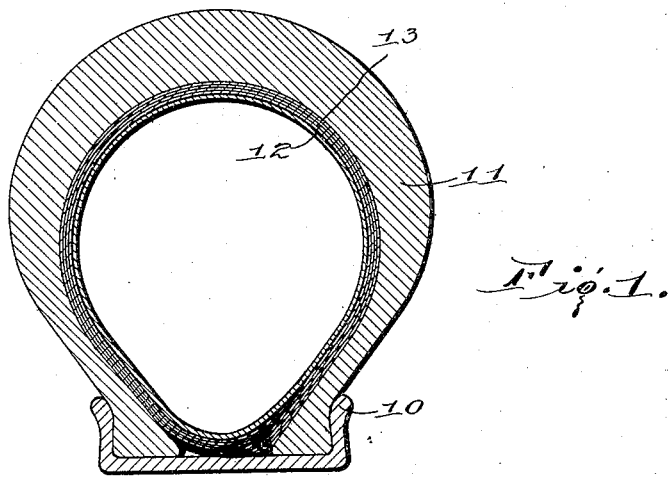
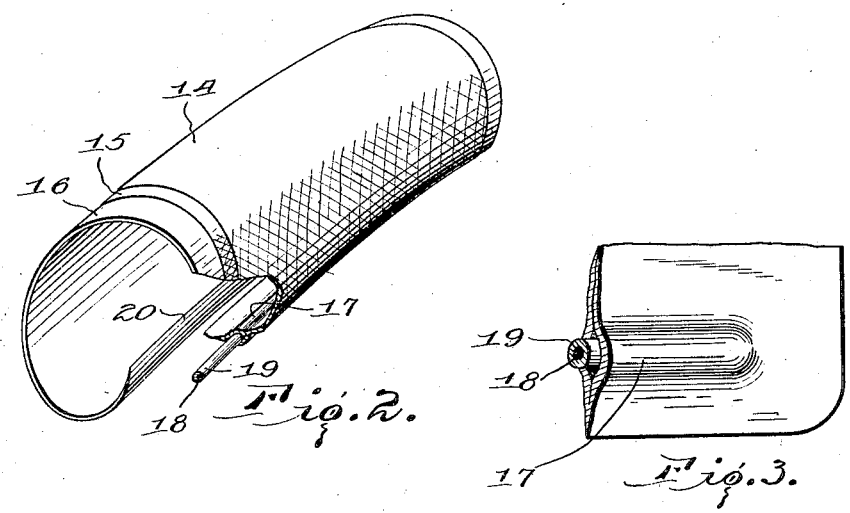

Patented Dec. 12, 1922.

1,438,657

UNITED STATES PATENT OFFICE.

LEWIS E. MILLS, OF BRYAN, OHIO.

TIRE BOOT.

Application filed September 22, 1921. Serial No. 502,435.

*To all whom it may concern:*

Be it known that I, LEWIS E. MILLS, residing at Bryan, in the county of Williams and State of Ohio, a citizen of the United States, have invented certain new and useful Improvements in Tire Boots, of which the following is a specification.

This invention relates to tire boots such as are used in pneumatic automobile tires in connection with the quick repair of tires after a blow-out has occurred.

A great many tire boots have been devised for insertion within the casing and outside of the tube of a pneumatic tire to protect the tube from a blow-out through the casing when the latter has become weakened or where a blow-out has occurred. A great many of these boots have metal projections which may injure the tube or casing and others have projecting portions which extend out within sight when the boot is applied to the tire.

It is the principal object of this invention to provide an improved tire boot which will be effective to protect the tube against a blow-out, will adjust itself to the inside of the casing without bringing any unnecessary strain on the tube and will not be unsightly.

Another object of this invention is the provision of a tire boot having a gripping means which is located adjacent one edge and which while not exerting any injurious pressure on the tube, will grip the other side of the boot and hold the same against the outward pressure of the tube.

Referring to the drawings wherein a preferred embodiment of my invention is illustrated, Figure 1 is a cross section of an automobile tire showing my improved tire boot installed therein.

Figure 2 is a perspective view of my improved tire boot and showing a portion broken away to indicate a manner of embedding the rib which produces the gripping action at the point where the two edges overlap.

Figure 3 is a fragmental detail view of a portion of the boot and on an enlarged scale.

Similar reference characters refer to similar parts in the several views.

10 designates a detachable rim, 11 the outer casing of a pneumatic tire, 12 designates the inner tube of the pneumatic tire. Between the outer casing and the inner tube of the tire and at the point where the blow-out has taken place is placed my improved tire boot which I have designated generally by the numeral 13.

Referring now particularly to Figures 2 and 3, the reference numerals 14, 15 and 16 designate layers of fabric which may be vulcanized in rubber in the usual manner to form the body portion of the boot. Adjacent one edge of the boot is a rib 17 suitably formed as by embedding an insulated copper wire composed of the wire 18 and the insulation 19. This rib forming member may be vulcanized between the layers of the boot if the body portion is composed of layers of fabric vulcanized together. The edges at the ends of the boot may be beveled to avoid pinching the tube.

After a blow-out, the boot is wrapped about the tube and the tube and boot replaced in the casing in such a manner that the blow-out rupture will be adjacent a point midway between the ends of the boot. The rib is preferably so placed that it will be adjacent the rim portion of the tube. The boot is made large enough in circumference so that the edge portion 20 will overlap the rib 17, as clearly shown in Figure 1. In this figure, the usual strip on the inner side of the tube, adjacent the rim, has been omitted for the sake of clearness.

When the tire is inflated, the edge portion 20 is gripped by the rib 17 and the two held firmly in position. This gripping action does not take place, however, until the tube has been inflated and has forced the boot against the inner wall of the casing. In this way, a hold between the edges of the boot is produced without the use of projections from the edges of the boot and yet permitting all parts to be smooth and without abnormal strain.

While I have described an embodiment of my invention, I desire to have it understood that modifications and changes may be made in the form and proportions and other materials used without departing from the spirit of my invention and within the scope of the appended claims.

Having described my invention, what I claim is:

1. A tire boot for the protection of an inner tube of a pneumatic tire, comprising a flexible body portion to fit the outside of an inner tube and having a rib portion adjacent one side thereof to prevent the boot from slipping when the tube is under pressure within the casing of a pneumatic tire, the portion between the rib and the adjacent edge being tapered to avoid sharp bending of the tube when in place.

2. A tire boot for the protection of an inner tube of a pneumatic tire, comprising a flexible body portion to fit the outside of an inner tube and having a rib portion adjacent one side thereof, the opposite edge being of sufficient length to overlap the rib portion.

3. A tire boot for the protection of an inner tube of a pneumatic tire, comprising a flexible body portion to fit the outside of an inner tube and having a rib portion adjacent one side thereof, the rib portion terminating short of the edge at the end of the tire boot.

In testimony whereof I hereunto affix my signature.

LEWIS E. MILLS.